United States Patent [19]

Stocker

[11] 4,212,361
[45] Jul. 15, 1980

[54] ELECTRICAL SCALE WITH IMPROVED IMMUNITY TO ENVIRONMENTAL DISTURBANCES

[75] Inventor: Rudolf Stocker, Azmoos, Switzerland

[73] Assignee: Mettler Instruments AG, Greifensee, Switzerland

[21] Appl. No.: 14,241

[22] Filed: Feb. 22, 1979

[30] Foreign Application Priority Data

Feb. 24, 1978 [CH] Switzerland .......................... 2026/78

[51] Int. Cl.² .......................... G01G 19/00; G01G 3/14
[52] U.S. Cl. ............................ 177/200; 177/210 EM; 177/210 FP
[58] Field of Search ............ 177/200, 21 FP, 210 EM

[56] References Cited

U.S. PATENT DOCUMENTS

| 3,322,222 | 5/1967 | Baur | 177/210 EM |
| 3,565,193 | 2/1971 | Wirth | 177/210 FP |

Primary Examiner—George H. Miller, Jr.
Attorney, Agent, or Firm—Marianne Rich

[57] ABSTRACT

Conventional electrical scales having independent weighing channels for a reference weight and the actual load with subsequent division of the resulting load signal by the reference signal to furnish the final output cannot furnish a final output signal independent of accelerating disturbances in a large critical frequency region, since changes in load change the dynamic behavior of the load channel. To substantially decrease variations in the final output signal due to such accelerating disturbances, the load signal is additionally coupled to the reference channel by means of at least one frequency-dependent network.

14 Claims, 5 Drawing Figures

ELECTRICAL SCALE WITH IMPROVED IMMUNITY TO ENVIRONMENTAL DISTURBANCES

The present invention relates to electrical scales having a load channel and a reference channel operative independently of each other and a combining circuit which combines the load signal furnished by the load channel and the reference signal furnished by the reference channel to yield the final output or measurement signal.

BACKGROUND AND PRIOR ART

In scales using the above-described two independent channels, which may or may not be of identical construction, the effect of a number of environmental disturbances as, for example, changes in gravity or a slightly tilted placement of the scale may be eliminated. However, the effect of acceleration disturbances cannot be completely eliminated. Such scales are relatively insensitive to very low frequency vibrations, but may be strongly affected by vibrations at frequencies of over 0.1 Hz. Thus, if the resolution of the final output signal, that is, of the actual displayed weight, is not held to a very low value, vibrations above such an intermediate frequency will result in changes in the displayed weight, since the dynamic behavior of the load channel cannot be kept exactly the same as that of the reference channel for varying loads.

In known scales of the above-described type, electrical filters with a lower limiting frequency of, for example, 10 Hz have been used to lower the critical frequency region from above. However, the lower the critical frequency of the filter the higher the required measuring time. Such an increase in measuring time is often highly undesirable.

SUMMARY OF THE INVENTION

It is an object of the present invention to furnish an electrical scale of the above-mentioned type which, in spite of a short weighing time and high resolution of the measurement signal is to a great extent insensitive against external disturbances which have accelerating effects. The immunity to such disturbances is to extend over the whole frequency range.

In accordance with the present invention coupling means are provided which apply a compensating signal varying as a function of the load signal and the frequency-dependent transfer characteristic of the coupling means to the reference channel. More particularly, the additional coupling means need comprise only linear networks. The scale according to the present invention has approximately the same behavior at extremely low frequencies as does a conventional scale. Its advantage relative to such conventional scales lies in the decreased acceleration sensitivity in what was previously the critical frequency range. Computations forming the basis for the circuits of the present invention show that a complete elimination of the effect of accelerating disturbances on the measurement signal is possible. In practice such a complete elimination cannot be achieved because of the tolerances of the components as well as approximations made when translating equations into actual circuitry. However, depending upon the particular frequency and the particular circuits used, up to 99% of all the acceleration effects have been eliminated from the final measurement signal.

In a preferred embodiment, the coupling means comprises a differentiator circuit and means for applying the reference signal to the coupling means are also provided. The compensating signal then varies both as a function of the differentiated reference and load signals.

In a preferred embodiment, the reference channel and the load channel are identical, a low pass filter is connected between the means furnishing the load signal and the load input of the combining means while a second, identical low pass filter is connected between the point at which the compensating signal is applied to the reference channel and the reference input of the combining means.

If the present invention is applied to electromagnetic scales wherein the load receiver receiving the actual load and the reference mass receiver which receives the reference load each tend to be deflected from an equilibrium position under action of the respective loads and are each returned to the equilibrium position by a control circuit which supplies, respectively, a load and a reference compensating current to return the actual and reference load receivers to the equilibrium position, the coupling means may have an input receiving only a load signal corresponding to the load compensating reference current or may have inputs receiving signals corresponding to both the load compensating current and a signal derived from a position sensor sensing the actual position of the load receiving means. In the latter case, the parameters of the control circuit regulating the load receiving means to the equilibrium position need not be considered when designing the coupling network.

The present invention is particularly suitable for use when a short measuring time is essential.

DESCRIPTION OF THE PREFERRED EMBODIMENTS

Figure 1:
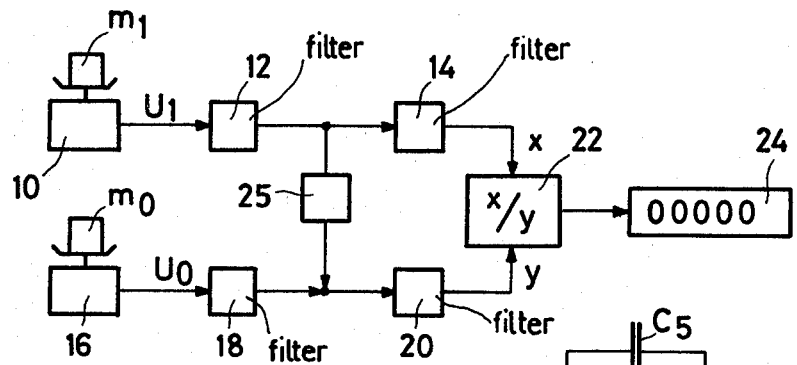
FIG. 1 is a basic block diagram showing basic apparatus of the present invention.

In FIG. 1, standard force measuring apparatus 10 has load receiving means for receiving a load m1 and load-responsive means for furnishing a load signal U1. Generally the signal U1 is a voltage. The signal U1 passes through circuits 12 and 14 if required and appears as a load signal at the load input of combining means, namely a divider 22. Circuits 12 and 14 may for example be filters, while the divider circuit 22 may be an analog building block or a dividing analog-digital converter.

The reference channel includes reference mass receiving means, that is a pan receiving the reference weight $m_O$ and reference signal furnishing means, indicated as a block 16 which furnishes a reference signal $U_0$ indicative of the reference load applied to the pan. The signal $U_0$, after passing through networks 18 and 20, which, if at all required, may for example be filters is applied to the reference input of divider 22. The measurement or final output signal furnished by divider 22 is displayed in digital form in a display 24. The mass $m_0$ remains the same throughout the weighing procedure.

All the above-described apparatus is conventional. The present invention is constituted by the coupling means, that is by block 25 which applies a compensating signal varying as a function of the load signal to the reference input of divider 22 (if need be, as indicated in FIG. 1, through filter 20). The actual point at which coupling circuit 25 is connected to the load channel or the reference channel may be varied, that is it need not necessarily be between filters 12 and 14 and filters 18 and 20, respectively. For example networks 12 and 18 or networks 14 and 20 may not be required at all.

In general a single coupling circuit 25 would be sufficient. However it is possible that a plurality of such coupling circuits may be indicated. However, the compensating signal would always be applied to the reference channel, i.e. directly or indirectly to the reference input of the divider 22, and would vary at least in part as a function of the load signal.

For the force measuring apparatus any scale could be utilized from which an output voltage varying as a function of load can be derived. For example spring scales with electrical output may be utilized as well as strain gauges or force measuring apparatus utilizing electromagnetic force compensation. If the force measuring apparatus furnishes a digital output signal, as for example scales utilizing vibrating strings, then the analog circuits illustrated would be replaced by digital circuits or by programs for, for example, a microprocessor.

It should also be noted that the present invention can be applied to equipment wherein the load and the reference channels are physically separated from each other as well as scales in which the two units are mounted in a single housing or combine to form a single scale.

Figure 2:
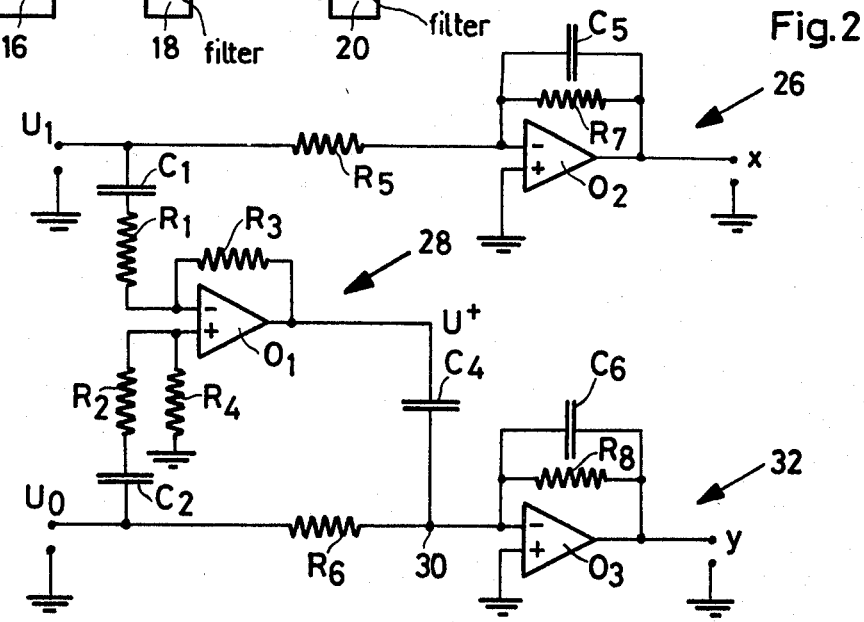
FIG. 2 is a circuit diagram of first embodiment of the present invention.

The embodiment shown in FIG. 2 is particularly appropriate for scales which furnish an analog voltage indicative, for example, of the position of the pan under load relative to a reference position that is, for example spring scales with electrical output or scales using strain gauge pickups. It is assumed that the scales have load and reference channels both of which operate according to the same principle although not necessarily with the same constants.

The load signal, $U_1$, passes through a resistor R5 and a low pass filter generally designated by reference numeral 26 to the load input of divider 22. Low pass filter 26 includes a operational amplifier $O_2$ having a grounded direct input, an inverting input connected to resistor R5, and a feedback impedance including the parallel combination of a resistor R7 and a capacitor C5. Similarly the reference signal $U_0$ passes through a resistor R6 to the inverting input of a operational amplifier $O_3$. The direct input of operational amplifier $O_3$ is grounded. A feedback circuit from the output of operational amplifier $O_3$ to its inverting input consists of a resistor R8 connected in parallel with a capacitor C6. The output of operational amplifier $O_3$ is connected to the reference input of divider 22. Operational amplifier $O_3$ and its feedback network together constitute a low pass filter 32.

Coupling network 28 couples the load signal to the reference channel. Specifically, the load signal is applied through a capacitor C1 and a resistor R1 to the inverting input of a operational amplifier $O_1$. The output of difference amplifier $O_1$ is connected through a capacitor C4 to the inverting input of operational amplifier $O_3$. It is further connected to its inverting input through a resistor R3. The direct input of operational amplifier $O_1$ is connected to one terminal each of a resistor R2 and a resistor R4. The other terminal of resistor R4 is at ground potential. The second terminal of resistor R2 is connected to receive the reference signal $U_0$ through a capacitor C2.

Operational amplifier $O_1$ and its associated components operate as a subtracting differentiator. Its output signal is designated as symbol $U^+$. Signal $U^+$ is again differentiated by capacitor C4 and is superimposed on reference signal $U_0$ at junction point 30, that is at the inverting input of operational amplifier $O_3$. At low frequencies coupling circuit 28 with capacitor C4 acts as a differentiator of second order, while at higher frequencies it acts as a first order differentiator. The signal at junction point 30, after filtering in low pass filter 32 which, preferably, is constructed in identical fashion to low pass filter 26, is applied to the reference input of divider 22. The signal at the reference input of divider 22 is denoted by y in FIG. 2.

The above-described circuit is based on the following theoretical considerations Equation 1 is derived from the differential equations describing the measurement and reference system under the assumption that each system consists of only one spring, one mass and a damping element. It will be noted that the acceleration b has been eliminated from the equations and that the load m1 is expressed explicitly. In equation 1 the subscripts 0 and 1 indicate the reference system and the load system respectively. Further:

$\lambda$ = spring constant = $2 \cdot 10^2$ kg/sec$^2$ $\rho$ = coefficient of friction of damping element = 5 kg/sec p = first derivative with respect to time = $d/dt$ where the numerical values are to be considered exemplary only and apply to both the load and reference channel (i.e. load and reference channel are identical). For identical channels the subscripts for the spring constant and the coefficient of friction in equation 1 can of course be eliminated. This will be assumed in the following discussion.

First, for eliminating the effect of higher frequency disturbances, both channels are to be filtered with the function according to equation 2, where T is a time constant, for example $5 \cdot 10^{-2}$ sec.

The resulting equation is given as equation 3. Equation 3 may be related to the circuit of FIG. 2 as follows.

low pass filters 26, 32 carry out the function $1/(1+pT)$; coupling circuit 28 generates the subtraction function as well as the function $p^2 m_0/(\lambda + p\rho)$ where the frequency $\lambda/2\pi\rho$ indicates the transition between the operation as second order differentiator and operation as a first order differentiator.

Figure 3:
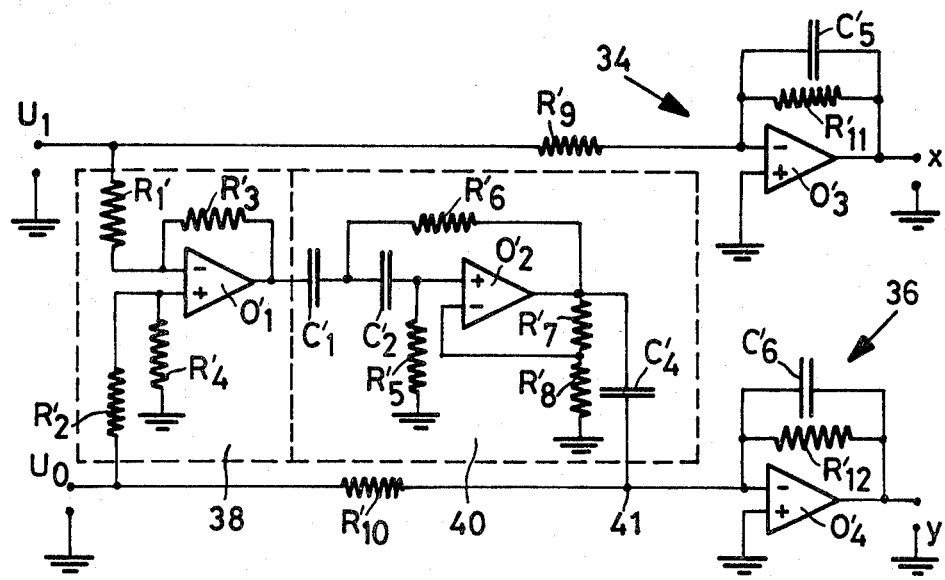
FIG. 3 is a circuit diagram of a second embodiment of the present invention.

A second embodiment of the invention is shown in FIG. 3. In this example the reference channel and the load channel both are equipped with force measurement devices with electromagnetic force compensation. The signals $U_1$ and $U_0$ are the voltages which have an amplitude corresponding to the amplitude of the respective force compensating currents. It must be noted that the load channel and the reference channel in this type of electromagnetic force compensating scale each contain a closed loop control circuit for maintaining the pans receiving the reference weight and the actual load to be weighed in a balance or equilibrium position. Such force measuring apparatus is well known and described, for example, in U.S. Pat. No. 4,062,417. It will not be discussed further herein, except to note that the presence of this control circuit causes the coupling circuit of the present invention to be somewhat more complicated.

Returning now to FIG. 3, the voltage $U_1$ is applied through a resistor $R'_9$ to a low pass filter 34. Low pass filter 34 comprises a operational amplifier $O'_3$ having a direct input which is at ground potential and having a feedback network including a resistor $R'_{11}$ connected in parallel with a capacitor $C'_5$. The signal $U_0$ is applied through a resistor $R'_{10}$ to the inverting input of a operational amplifier $O'_4$. The direct input of operational amplifier $O'_4$ is at ground potential. The output of operational amplifier $O'_4$ is connected to the reference input of divider 22 (not shown); a feedback circuit consisting of a resistor $R'_{12}$ connected in parallel with a capacitor $C'_6$ is connected from the output of operational amplifier $O'_4$ to its inverting input.

The voltage $U_1$ is further applied through a resistor $R'_1$ to the inverting input of an operational amplifier $O'_1$. Operational amplifier $O'_1$ has a feedback resistor $R'_3$. The output of operational amplifier $O'_1$ is connected through a capacitor $C'_1$ and a capacitor $C'_2$ to the direct input of an operational amplifier $O'_2$; the output of operational amplifier $O'_2$ is connected through a resistor $R'_6$ to the common point of capacitor $C'_1$ and $C'_2$. The direct input of operational amplifier $O'_2$ is connected to ground potential through a resistor $R'_5$. The output of operational amplifier $O'_2$ is connected to ground potential through a resistor $R'_7$ and $R'_8$. The common point of resistors $R'_7$ and $R'_8$ is connected to the inverting input of operational amplifier $O'_2$. Finally, the output of operational amplifier $O'_2$ is connected through a capacitor $C'_4$ to a junction point 41 where it is superimposed on reference voltage $U_0$. Junction point 41 is electrically identical to the inverting input of operational amplifier $O'_4$.

The circuit of FIG. 3 is based upon the following theoretical considerations.

It is assumed that the reference and load measuring channels are the same and have the same compensation systems and the same PID regulators. Further it is assumed that the transfer function of the force measurement device is given by equation 4, $\nu$ being a constant; that the control circuit operate according to the function given in equation 5; and that a filter is provided both in the load and in the reference channel which operates according to the function given in equation 6.

Under these assumptions equation 7 can be derived. This equation is related to the circuit of FIG. 3 as follows:

Low pass filters 34 and 36 carry out the function $1/(1+pT_3)$;

subtracting circuit 38 forms the difference $U_0-U_1$; network 40 is a high pass third order filter and operates as a third order differentiator at low frequency and as a first order differentiator at high frequencies. This circuit performs the functions according to the first factor of the second summing term in the denominator of equation 7;

the summation of the two terms in the denominator of equation 7 takes place at junction point 41 (the inverting input of operational amplifier $O'_4$ of filter 36).

Figure 4:
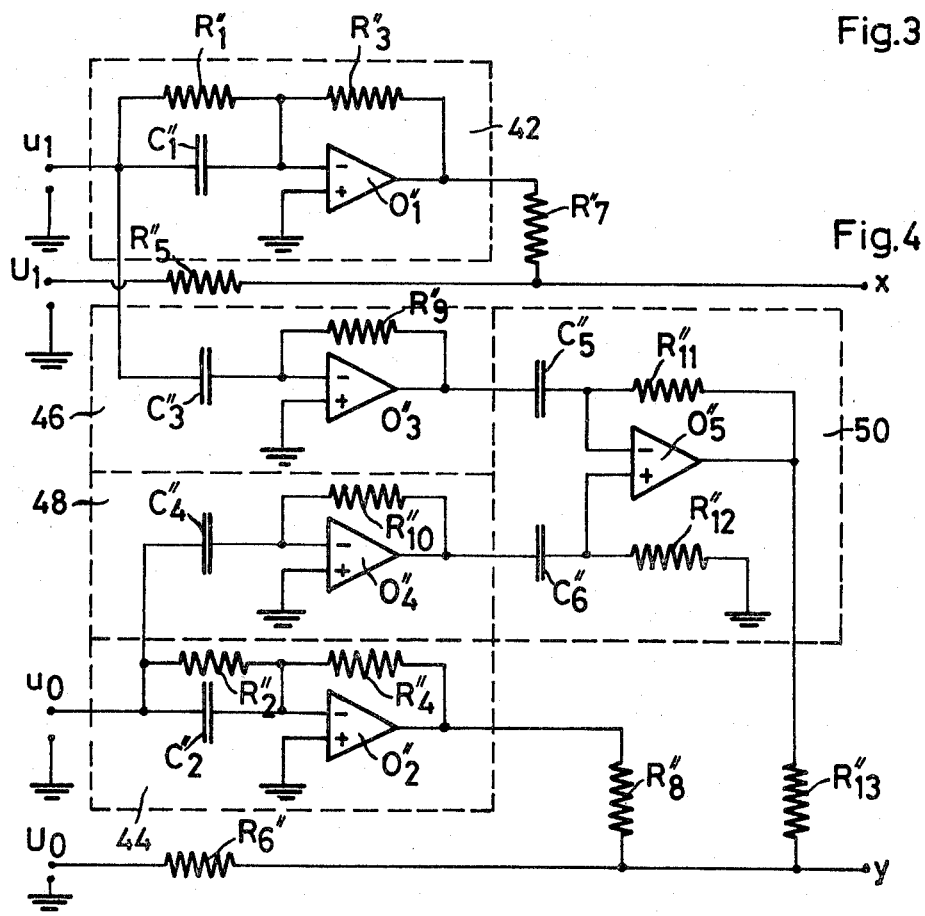
FIG. 4 is a circuit diagram showing a third embodiment of the present invention.

FIG. 4 shows an alternate embodiment of the present invention used in conjunction with an electromagnetic force compensating scale. In this example signal $u_1$ and $u_0$, namely the signals which are derived from the position sensors of the load and the reference system, are utilized as well as the signals $U_1$ and $U_0$, which, as explained above, are voltages corresponding to the magnitude of the compensating current. When signals $u_1$ and $u_0$ are utilized, the control parameters of the scale can be disregarded. This greatly simplifies the design, but does result in a circuit having an increased number of components.

For simplification, filters corresponding to filters 34 and 36 in FIG. 3 are not shown in FIG. 4.

For the example shown in FIG. 4, it is assumed that the reference and load channels of the scale operate with the same force compensating system as in the previous example, but that the constants for the reference channel are not the same as those for the load channel. Subscripts 1 and 0 indicate the load and reference channels respectively. The equation derived under these assumptions is equation 8.

This equation is implemented in the circuit shown in FIG. 4.

In FIG. 4 the signal $U_1$ is applied through a resistor $R''_5$ to a terminal denoted by x, i.e. either the input to a filter corresponding to filter 34 of FIG. 3 or the load input of the divider. The signal $u_1$ is applied through a coupling network 42 herein referred to as a third coupling means, and through a resistor $R_7$ to the same terminal x. Coupling network 42 includes an operational amplifier $O''_1$ having a grounded direct input, an inverting input and an output. Signal $u_1$ is applied through a capacitor $C''_1$ to the inverting input of operational amplifier $O''_1$. A resistor $R''_1$ is connected in parallel with capacitor $C''_1$. A feedback resistor $R''_3$ is connected from the output of operational amplifier $O''_1$ to its inverting input.

Similarly the signal $u_0$ is applied through a coupling network 44 and a resistor $R''_8$ to terminal y. Coupling network 44 is identical in construction to coupling network 42 and includes an operational amplifier $O''_2$. It is herein referred to as second coupling means.

Signal $u_1$ is also applied to terminal y through first coupling means, namely coupling networks 46 and 50. Specifically, signal $u_1$ is applied through a capacitor $C''_3$ to the inverting input of an operational amplifier $O''_3$. The direct input of operational amplifier $O''_3$ is grounded. A feedback resistor $R''_9$ is connected from the output of operational amplifier $O''_3$ to its inverting input. In coupling circuit 50, the output of operational amplifier $O''_3$ is connected through a capacitor $C''_5$ to the inverting input of an operational amplifier $O''_5$. The direct input of operational amplifier $O''_5$ is connected to ground through a resistor $R''_{12}$ and is further connected to one terminal of a capacitor $C''_6$ whose other terminal receives the output of a coupling network 48 to be described below. The output of operational amplifier $O''_5$ is connected to its inverting input through a resistor $R''_{11}$ and to terminal y through a resistor $R''_{13}$.

The signal $u_0$ is applied to the direct input of operational amplifier $O''_5$ through the coupling network 48 mentioned above. The coupling network 48 is identical in construction to coupling network 46 and includes an operational amplifier $O''_4$.

The above-described circuit performs the functions given in equation 8 as follows:

Circuits 42 and 44 generate the functions $(\lambda_1+p\rho_1)/\eta_1$ and $(\lambda_0+p\rho_0)/\eta_0$ respectively.

Circuits 46 and 48 act as first order differentiators, while circuit 50 (with $R''_{11}C''_5=R''_{12}C''_6$) acts as subtractor and first order differentiator. Networks 46, 48 and 50 together implement the function $$p^2 m_0 \left( \frac{u_0}{\eta_0} - \frac{u_1}{\eta_1} \right);$$

and the additions are carried out by means of resistors $R''_5$, $R''_7$ and $R''_6$, $R''_8$ and $R''_{13}$, respectively.

In addition to the circuits shown in FIG. 4, it is generally appropriate to provide identical filters at each input, that is to filter signals $U_1$, $U_0$, $u_1$ and $u_0$ before applying them to the circuits shown. This would prevent overdriving of the differentiating circuits. A suitable filter would comprise an operational amplifier having the input signal connected through a resistor to its direct input and having its output directly connected to its inverting input. The direct input of the operational amplifier would have a capacitor connected to ground. The time constant of such a filter could be in the order of 5msec.

Figure 5:
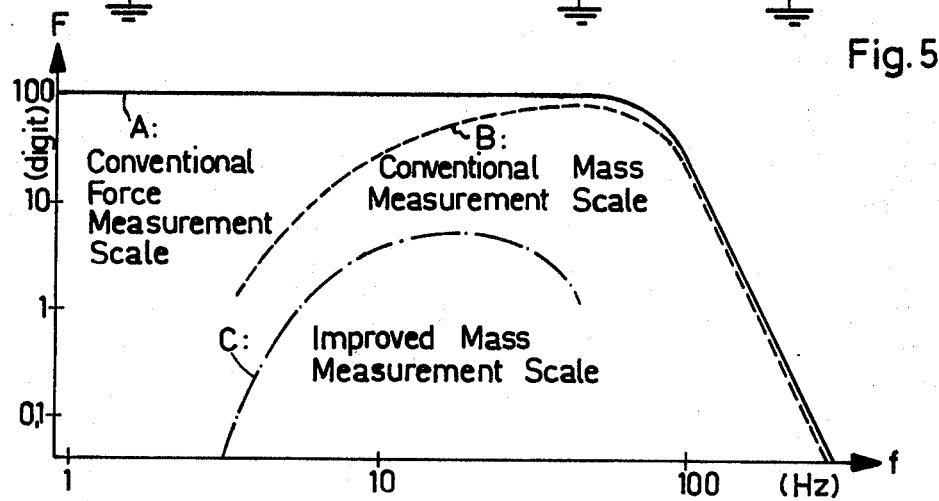
FIG. 5 is a curve showing the variation of output signal as a function of frequency of external disturbances for conventional scales and for a scale using the coupling means of the present invention.

Typical values of the constants used in equations 4, 5 and 6 for a scale adapted to weigh loads up to 0.35 kg are: Force measurement device (unit 18 of U.S. Pat. No. 4,039,036):
 $\nu = 11.6 \cdot 10^3$ kg sec$^{-2}$
 $\mu = 19$ kg sec$^{-2}$
 $\rho = 8.7$ kg sec$^{-1}$
 $m_o = 0.22$ kg
Control circuit (unit 26 of U.S. Pat. No. 4,039,036):
 $V = 0.66$
 $T_1 = 10.0 \cdot 10^{-3}$ sec
 $T_2 = 40.4 \cdot 10^{-3}$ sec
 $T_3 = 4.0 \cdot 10^{-3}$ sec FIG. 5 shows a plurality of curves of variation in the final output signal (displayed weight) as a function of disturbance frequency, at constant acceleration disturbance amplitude and for a given resolution in the display.

Curve A shows the action of a force measurement scale. It will be noted that large variations in the final output signal occur below a critical frequency. For a conventional mass measuring apparatus with the same filter action at the higher frequencies, curve B indicates that the displayed weight is subject to large variations except at very low frequencies, that is only at very low frequencies do accelerating disturbances have no effect on the displayed weight. At higher frequencies the action of the mass measuring apparatus is similar to that of the force measuring apparatus shown in curve A. As is indicated in curve C, a mass measuring apparatus in accordance with the present invention has a very great decrease in variations in the final output signal over the whole frequency range. Stated differently, in the intermediate frequency range in which acceleration disturbances cause large variations in the displayed weight of the conventional scales, a scale incorporating the additional coupling network of the present invention shows markedly improved behavior. It should also be noted that the scales in FIG. 5 are logarithmic scales.

Many variations of the basic idea of the present invention are possible, and depend upon the particular measuring principle used in the conventional scale and on the particular construction of the system.

Advantages of the scale utilizing the principle of the present invention are, among others:

for directly measuring systems, that is systems without a closed control loop, as for example in spring scales or scales utilizing strain gauges, the present invention constitutes the only known solution for (theoretically completely) eliminating the effect of acceleration disturbances on the displayed weight without at the same time decreasing the resolution or decreasing the measuring frequency basically available in the systems.

For scales incorporating automatic control systems, the invention gives a simpler and more exact alternative to known adaptive control, which is non-linear and therefore more difficult to control.

The present invention may also be applied to digital systems. For digital systems either the logic circuits or the programs would be designed to correspond exactly to the analog signal processing disclosed above for numerous examples.

The construction of rapidly operating systems with a steady display independent of frequency of accelerating disturbances can be obtained.

The measuring channel and the load channel of the scales need not be identical.

While the invention has been illustrated in preferred embodiments, it is not to be limited to the circuits and structures shown, since many variations thereof will be evident to one skilled in the art and are intended to be encompassed in the present invention as set forth in the following claims.

EQUATIONS $$\frac{m_1}{m_0} = \frac{(\lambda_1 + p\rho_1)U_1}{(\lambda_0 + p\rho_0)U_0 + p^2 m_0 (U_0 - U_1)} \tag{1}$$

$$f_T = \frac{1}{(\lambda + p\rho)(1 + pT)} \tag{2}$$

$$\frac{m_1}{m_0} = \frac{\dfrac{U_1}{1 + pT}}{\dfrac{U_0}{1 + pT} + \dfrac{p^2 m_0 (U_0 - U_1)}{(\lambda + p\rho)(1 + pT)}} \tag{3}$$

$$f_S = \frac{\eta}{\lambda + p\rho + p^2 m} \quad (\eta = \text{constant}) \tag{4}$$

$$f_R = V \left( pT_1 + 1 + \frac{1}{pT_2} \right) \quad (V = \text{constant}) \tag{5}$$

$$f_P \left( 1 + \frac{pT_2(\lambda + p\rho)}{V\eta(1 + pT_2 + p^2 T_1 T_2)} \right)^{-1} (1 + pT_3)^{-1} \tag{6}$$

$$\frac{m_1}{m_0} = \frac{\dfrac{U_1}{1 + pT_3}}{\dfrac{U_0}{1 + pT_3} + \dfrac{p^3 m_o T_2}{V\eta(1 + pT_2 + p^2 T_1 T_2) + pT_2(\lambda + p\rho)} \cdot \dfrac{U_0 - U_1}{1 + pT_3}} \tag{7}$$

$$\frac{m_1}{m_0} = \frac{\beta_1 U_1 + \dfrac{\lambda_1 + pp_1}{\eta_1} u_1}{\beta_0 U_0 + \dfrac{\lambda_0 + pp_0}{\eta_0} u_0 + p^2 m_0 \left(\dfrac{u_0}{\eta_0} - \dfrac{u_1}{\eta_1}\right)} \quad (8)$$

I claim:

1. In an electrical scale subject to environmental disturbances, said electrical scale having load receiving means for receiving a load to be weighed, load-responsive means connected to said load receiving means for furnishing a first load signal varying as a function of the weight of said load, reference mass receiving means for receiving a reference load, reference signal furnishing means connected to said reference mass receiving means for furnishing a reference signal responding to the weight of said reference load, and combining means having a load input connected to said load-responsive means and a reference input connected to said reference signal furnishing means for furnishing a final output signal indicative of said weight of said load relative to said reference mass, said final output signal having undesired variations due to said environmental disturbances:

the improvement comprising means for decreasing said undesired variations of said final output signal, said means comprising coupling means having a transfer characteristic varying as a predetermined function of frequency intercoupled between said load-responsive means and said reference input of said combining means for furnishing a compensating signal varying as a function of said load signal and said transfer characteristic of said coupling means to said reference input of said combining means, whereby differences in variation of said load signal and said reference signal resulting from acceleration effects of said environmental disturbances are substantially decreased.

2. An improved electrical scale as set forth in claim 1, wherein said coupling means comprises a coupling circuit having a linear network.

3. An improved electrical scale as set forth in claim 2, further comprising first low pass filter means connected between said coupling means and said load input of said combining means and second low pass filter means connected between said coupling means and said reference input of said combining means.

4. An improved electrical scale as set forth in claim 3, wherein said first and second low pass filter means are substantially identical to each other.

5. An improved electrical scale as set forth in claim 2, wherein said coupling circuit means comprises differentiator circuit means.

6. An improved electrical scale as set forth in claim 5, wherein said load receiving means comprises electromagnetic load receiving means adapted to move from a balance position to a load position upon application of a load thereto and further adapted to move from said load position back to said balance position upon application of a load-compensating current thereto;

wherein said load-responsive means comprises load position sensing means for furnishing a first load signal indicative of the position of said load receiving means relative to said balance position, first control circuit means connected to said load sensing means for supplying said load-compensating current to said load receiving means at least in part under control of said first load signal, and second load signal furnishing means for furnishing a second load signal varying as a function of said load-compensating current;

wherein said reference mass receiving means comprises electromagnetic reference mass receiving means adapted to move from an equilibrium position towards a reference position in response to application of said reference load and back to said equilibrium position in response to application of reference compensating current thereto;

wherein said reference signal furnishing means comprises reference position sensing means for furnishing a first reference signal indicative of the position of said reference mass receiving means relative to said equilibrium position, second control circuit means connected to said reference position sensing means and said reference mass receiving means for furnishing said reference compensating current to said reference mass receiving means at least in part under control of said first reference signal, and second reference signal furnishing means connected to said second control signal furnishing means for furnishing a second reference signal varying as a function of said reference compensating current;

and wherein said coupling means comprises first coupling means intercoupled between said load position sensing means and said reference input of said combining means for furnishing a first compensating signal varying as a function of said first load signal to said reference input, second coupling means intercoupled between said second reference signal furnishing means and said reference input of said combining means for furnishing a second compensating signal varying as a function of said second reference signal to said reference input;

further comprising third coupling means interconnected between said load position sensing means and said load input of said combining means for furnishing an additional compensating signal varying as a function of said first load signal to said load input of said combining means.

7. An improved electrical scale as set forth in claim 5, wherein said differentiator circuit means constitutes second order differentiator circuit means at frequencies up to a predetermined limiting frequency and first order differentiator circuit means above said predetermined limiting frequency.

8. An improved electrical scale as set forth in claim 7, wherein said differentiator circuit means constitutes first differentiator circuit means;

further comprising second differentiator circuit means connected to said reference signal furnishing means for furnishing a differentiated reference signal;

and wherein said coupling means further comprises means for applying said differentiated reference signal to said differentiator circuit means, whereby said compensating signal further varies in part as a function of said differentiated reference signal.

9. An improved electrical scale as set forth in claim 8, wherein said first differentiator circuit means comprises a first RC circuit connected to said load-responsive means and operational amplifier means having an inverting input connected to said first RC circuit means, an output, and a direct input;

and wherein said applying means comprises means for applying said differentiated reference signal to said direct input of said operational amplifier means.

10. An improved electrical scale as set forth in claim 9, further comprising output capacitor means connected between said output of said operational amplifier means and said reference input of said combining means.

11. An improved electrical scale as set forth in claim 5, wherein said load receiving means comprises electromagnetic load receiving means adapted to move from a balance position to a load position upon application of a load thereto and further adapted to move from said load position back to said balance position upon application of a load-compensating current thereto;

wherein said load-responsive means comprises load position sensing means for furnishing a first load signal indicative of the position of said load receiving means relative to said balance position, first control circuit means connected to said load sensing means for supplying said load-compensating current to said load receiving means at least in part under control of said first load signal, and second load signal furnishing means for furnishing a second load signal varying as a function of said load-compensating current;

wherein said reference mass receiving means comprises electromagnetic reference mass receiving means adapted to move from an equilibrium position towards a reference position in response to application of said reference load and back to said equilibrium position in response to application of reference compensating current thereto;

wherein said reference signal furnishing means comprises reference position sensing means for furnishing a first reference signal indicative of the position of said reference mass receiving means relative to said equilibrium position, second control circuit means connected to said reference position sensing means and said reference mass receiving means for furnishing said reference compensating current to said reference mass receiving means at least in part under control of said first reference signal, and second reference signal furnishing means connected to said second control signal furnishing means for furnishing a second reference signal varying as a function of said reference compensating current;

wherein said combining means comprises dividing means;

and wherein said coupling means comprises means for combining and differentiating said second load signal and said second reference signal and furnishing a compensating signal corresponding to the so-differentiated and combined second load and reference signals to said reference input of said dividing means.

12. An improved electrical scale as set forth in claim 11, wherein said combining and differentiating means comprises first operational amplifier means having an inverting input connected to receive said second load signal, a direct input connected to receive said second reference signal and a first operational amplifier output for furnishing a difference signal corresponding to the difference between said second reference signal and said second load signal, and differentiating circuit means connected between said operational amplifier output and said reference input of said dividing means.

13. An improved electrical scale as set forth in claim 12, wherein said differentiating circuit means comprises second operational amplifier means having a direct input, an inverting input and a second operational amplifier output, a first and second capacitor connected between said output of said first operational amplifier means and said direct input of said second operational amplifier means, a first feedback resistor connected between said second operational amplifier output and said first and second capacitor, a second feedback resistor connected between said second operational amplifier output and said inverting input of said second operational amplifier means, a third resistor connected from said direct input of said second operational amplifier means to ground potential, a fourth resistor connected from said inverting input of said second operational amplifier means to ground potential and an output capacitor connected from said second difference amplifier output to said reference input of said dividing means.

14. An improved electrical scale as set forth in claim 13, further comprising first low pass filtering means interconnected between said second load signal furnishing means and said load input of said combining means and second low pass filtering means having an input connected to said second reference signal furnishing means and an output connected to said reference input of said dividing means;

and wherein said compensating signal is applied to said input of said second low pass filtering means.

* * * * *